United States Patent [19]
Motegi

[11] Patent Number: 5,353,292
[45] Date of Patent: Oct. 4, 1994

[54] LASER LIGHT WAVELENGTH CONVERSION APPARATUS CAPABLE OF PROVIDING A UNIFORM TEMPERATURE DISTRIBUTION

[75] Inventor: Tetsuya Motegi, Tokyo, Japan
[73] Assignee: Hoya Corporation, Tokyo, Japan
[21] Appl. No.: 970,000
[22] Filed: Nov. 2, 1992
[30] Foreign Application Priority Data
  Oct. 31, 1991 [JP] Japan .................. 3-286416
[51] Int. Cl.⁵ .......................... G02F 1/35; H01S 3/108
[52] U.S. Cl. ................................ 372/21; 359/326
[58] Field of Search .................. 372/21, 22, 23; 385/122; 359/326-332

[56] References Cited
U.S. PATENT DOCUMENTS

| | | | |
|---|---|---|---|
| 4,019,159 | 4/1977 | Hon et al. | 372/22 X |
| 4,044,316 | 8/1977 | Kennedy | 372/22 |
| 5,093,832 | 3/1992 | Bethune et al. | 372/21 |
| 5,179,562 | 1/1993 | Marason et al. | 372/22 |
| 5,187,714 | 2/1993 | Okazaki et al. | 359/326 X |
| 5,198,837 | 3/1993 | Ikshizaka et al. | 372/22 X |

Primary Examiner—John D. Lee
Attorney, Agent, or Firm—Ladas & Parry

[57] ABSTRACT

Disclosed is a laser light wavelength conversion apparatus which generates a wavelength converted laser light beam having a different wavelength from an incident wavelength of an incident laser light beam. The wavelength conversion apparatus comprises a non-linear optical crystal 21 of a thin plate and heaters 24 attached to both side surfaces of the optical crystal 21. The incident laser light beam of a wavelength of 532 nm is incident onto an incident surface of the optical crystal 21 and generates the wavelength converted laser light beam having a wavelength of 266 nm. The heaters are controlled so that the temperatures of the heaters 24B and 24D adjacent to an output surface becomes lower than the temperatures of the heaters 24A and 24C adjacent to the incident surface so as to render the temperature distribution substantially uniform in the optical crystal plate 21.

11 Claims, 10 Drawing Sheets

LASER LIGHT WAVELENGTH CONVERSION APPARATUS CAPABLE OF PROVIDING A UNIFORM TEMPERATURE DISTRIBUTION

BACKGROUND OF THE INVENTION

This invention relates to a laser light wavelength conversion apparatus which generates an output laser light beam having a different wavelength from an input wavelength of an incident laser light beam.

DESCRIPTION OF THE PRIOR ART

A conventional laser light wavelength conversion apparatus is disclosed in an article entitled "Second Harmonic Generation of Slab Lasers" by Bruce P. Boczer (SPIE Vol. 736 New Slab and Solid-State Laser Technologies and Applications, pp. 60–64 (1987).

In such a conventional laser light wavelength conversion apparatus, the incident laser light beam is applied to a non-linear optical crystal plate which is supported by a heat-sink or a chassis. In this event, the heat-sink or the chassis is attached to the supporting surfaces of the optical crystal plate which are orthogonal to the incident surface. The optical crystal plate generates the output laser light beam having the output wavelength different from the input wavelength of the incident laser light beam. In other words, the non-linear optical crystal plate is operable to convert the wavelength of the incident laser light beam into the output laser light beam.

During the wavelength conversion, the non-linear optical crystal plate partially absorbs the energy of the incident laser light beam and the wavelength converted laser light beam, namely, the output laser light beam. This results in generation of heat in the non-linear optical crystal. As a result, temperature differences, that is, non-flat temperature distributions appear in the non-linear optical crystal plate. Such non-flat temperature distributions bring about an inclination or gradient of a refractive index and deteriorates the wavelength conversion efficiency. Further, it often happens that the optical crystal plate is destroyed due to fatigue caused by the thermal expansion.

In order to solve these problems, in the conventional laser light wavelength conversion apparatus, the optical crystal plate is made thin and the areas of the supporting surfaces are increased so as to improve the heat transfer efficiency and to suppress the temperature rise in the optical crystal plate.

On the other hand, rotatory polarization of the incident laser light beam is varied about a rotational symmetric axis and gives serious influence to the wavelength conversion efficiency. In the case where the temperature distribution is flat along a direction of the width of the supporting surfaces, neither the rotatory polarization appears nor the deterioration takes place in the wavelength conversion efficiency by the heat generated in the optical crystal plate.

However, the density distribution of the incident laser light beam is not generally flat, and a shape in the laser light of a transverse mode is not rectangular in section and may be elliptical in shape. When the transverse mode laser light beam of the elliptical shape is incident onto the optical crystal plate, the generated heat in the optical crystal plate varies along the direction of the width of the supporting surface. As a result, a temperature of the optical crystal plate is highest at a center portion of the crystal and decreases toward both of peripheral sides. In other words, the temperature distribution is not flat in the optical crystal plate, which results in the inclination of the refractive index. This causes the the rotary polarization of the laser light beam to occur and deteriorates the wavelength conversion efficiency. Therefore, it is impossible to obtain the wavelength converted laser light beam of high power.

BRIEF DESCRIPTION OF THE INVENTION

It is an object of this invention to provide a laser light wavelength conversion apparatus for generating a wavelength converted laser light at a high efficiency.

Another object of this invention is to provide a laser light wavelength conversion apparatus in which variation in the temperature distribution is suppressed and the deterioration in the wavelength conversion efficiency due to the rotatory polarization is prevented even when the transverse mode laser light beam of the elliptical shape is applied thereto.

SUMMARY OF THE INVENTION

A laser light wavelength conversion apparatus to which this invention is applicable is for use in responding to an incident light beam of a first wavelength to generate an output light beam which has a second wavelength different from the first wavelength. According to this invention, the apparatus comprises, a non-linear optical crystal of a thin plate having an incident surface which receives the incident laser light beam and which has a center portion and a peripheral portion surrounding the center portion. The optical crystal generates the output laser light beam of the second wavelength and has a temperature distribution between the center portion and the peripheral portion when the incident laser light is incident onto the incident surface. The apparatus further comprises heating means for heating the optical crystal to render the temperature distribution substantially uniform.

Preferably, the heating means is separated into plural portions which can be controlled independently.

According to this invention, the flat temperature distribution characteristic can be obtained in the optical crystal for generating the wavelength converted laser light beam, thereby to prevent the deterioration in the wavelength conversion efficiency.

The above-mentioned and the other objects, features and advantages of this invention will become more apparent by reference to the following detailed description of embodiments of this invention taken in conjunction with the accompanying drawings.

DETAILED DESCRIPTION OF THE INVENTION:

Before the description of the embodiments, the conventional laser light wavelength conversion apparatus will be described with reference to FIGS. 1 to 2.

Figure 1:
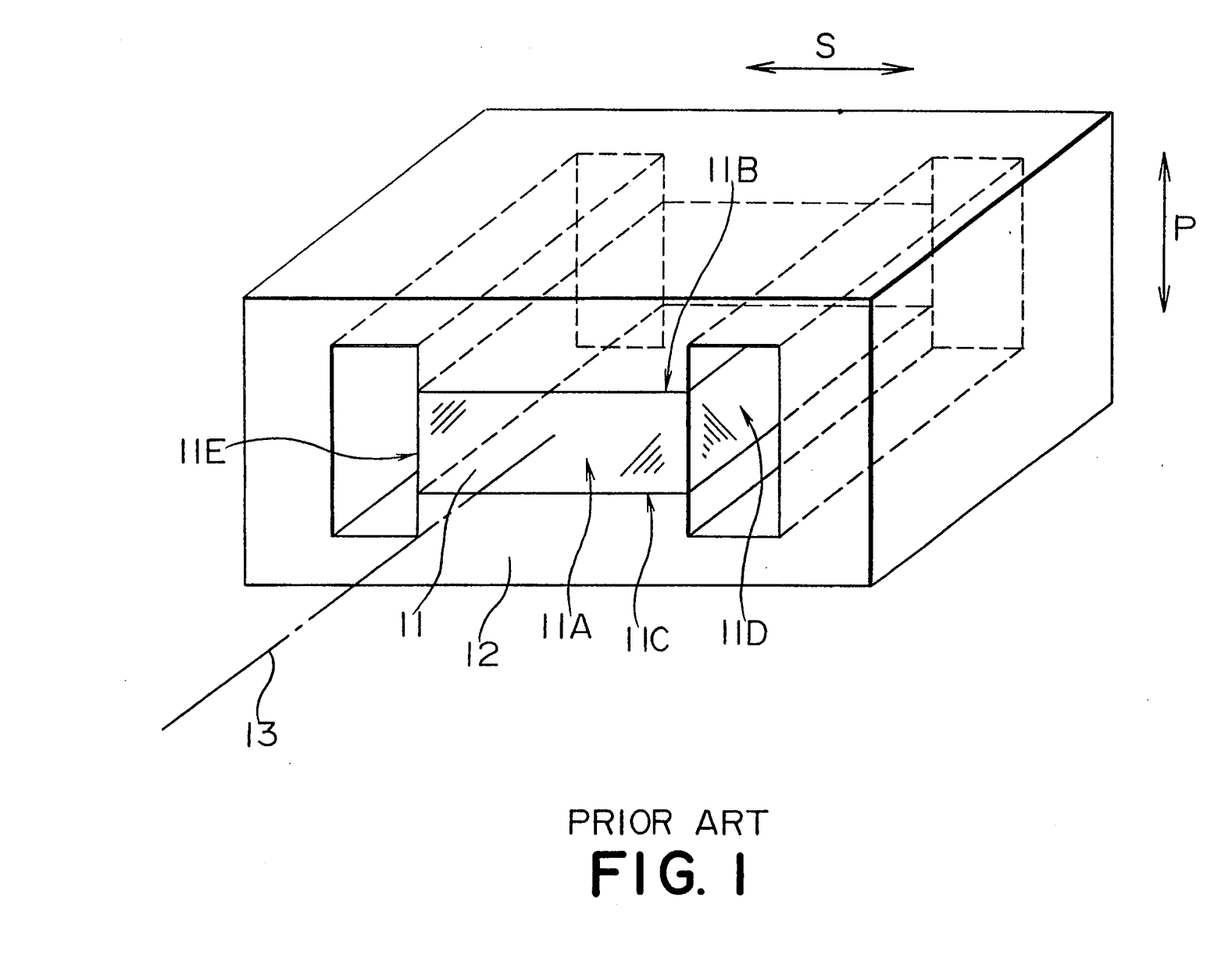
FIG. 1 is a schematic perspective view of a conventional laser light wavelength conversion apparatus.

Referring to FIG. 1, the illustrated conversion apparatus comprises a non-linear optical crystal plate 11 formed by $KD_2PO_4$ or KD*P. The optical crystal plate 11 has an incident surface 11A onto which an incident laser light beam is incident along an optimum phase-matched angle direction light axis 13. The optical crystal plate 11 is supported by a heat-sink or chassis 12 which is brought into contact with supporting surfaces 11B and 11C extending in perpendicular to the incident surface 11A. The heat generated in the optical crystal plate 11 is transferred to the heat-sink or chassis 12 and radiated therefrom.

When the incident laser light beam of a first wavelength is incident along the light axis 13 onto the incident surface 11A, the optical crystal plate 11 generates through an output surface an output laser light beam having a second wavelength different from the first wavelength. In other words, the optical crystal plate 11 serves to carry out the wavelength conversion to provide the wavelength converted laser light beam, namely, the output laser light beam.

During the wavelength conversion, the optical crystal plate 11 partially absorbs the energy of the incident laser light beam and the wavelength converted laser light beam and heat is generated in the optical crystal plate 11. As a result, temperature differences, that is, nonuniform or non-flat temperature distributions appear in the optical crystal plate 11 due to the heat. The non-flat temperature distributions cause an inclination of a refractive index to occur in the optical crystal plate 11 and deteriorates a wavelength conversion efficiency. Further, there is the case where the optical crystal plate 11 is destroyed due to fatigue caused by the thermal expansion. To solve these problems, it is preferable that the optical crystal plate 11 is thin and that the areas of the supporting surfaces 11B and 11C are wide so as to improve heat transfer efficiency and to suppress a temperature rise in the optical crystal plate 11.

Figures 2A, 2B:
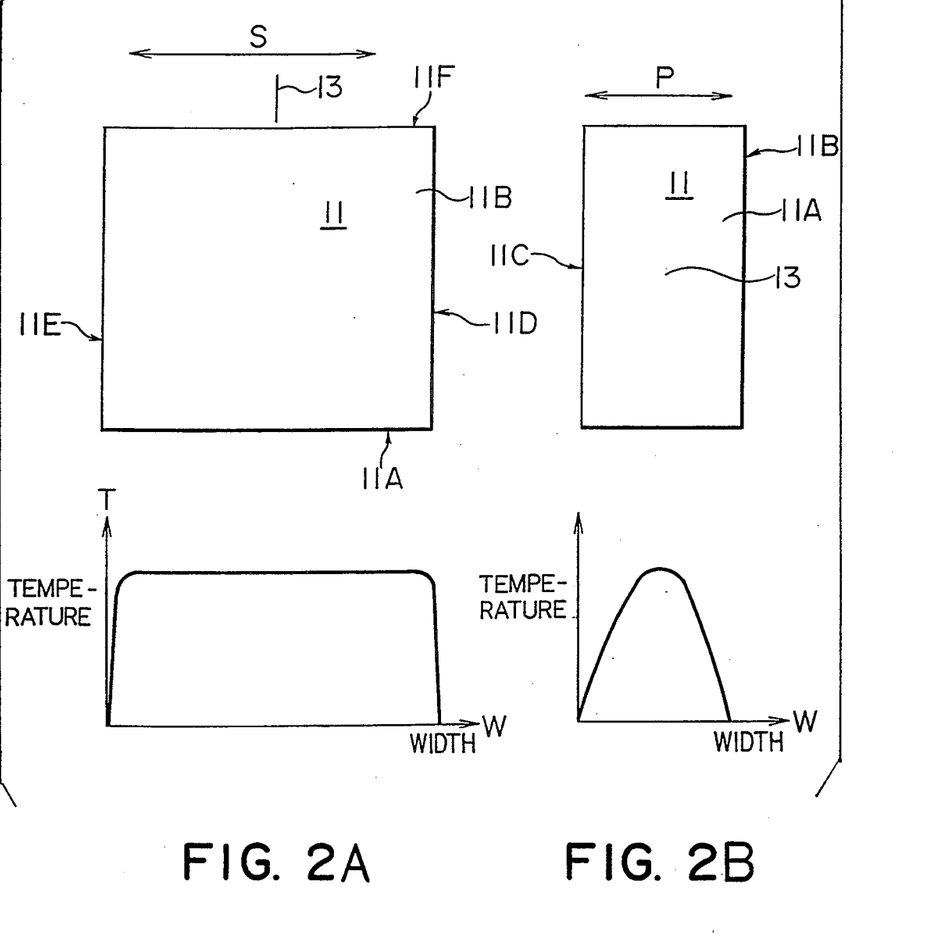
FIGS. 2(a) and 2(b) show the temperature distribution in the optical crystal plate of the conventional laser light wavelength conversion apparatus shown in FIG. 1.

Referring to FIG. 2, the temperature distributions in the optical crystal plate 11 are illustrated which appear on the assumption that heat is uniformly generated in the optical crystal plate 11 due to absorption of the incident laser light and the wavelength converted laser light. FIG. 2(a) shows the temperature distribution which is measured along the direction S of each width of the supporting surfaces 11B and 11C while FIG. 2(b) shows the temperature distribution which is measured along the direction P of a distance between the supporting surfaces 11B and 11C. As understood from FIG. 2(a), a uniform temperature distribution appears along the direction S of the width of the supporting surfaces 11B and 11C. On the other hand, the nonuniform temperature distribution appears along the direction P of the distance between the supporting surfaces 11B and 11C.

The rotary polarization of the incident laser light beam takes place and varies the rotational symmetric axis parallel to the incident surface 11A and the direction P. Such variation of the rotational symmetric axis adversely affects the wavelength conversion efficiency. When the temperature distribution is flat or uniform along the direction S, the rotary polarization does not occur. This means that no deterioration takes place in the wavelength conversion efficiency due to the heat generated in the optical crystal plate 11.

However, it is practically usual that density distribution of the incident laser light is not generally uniform and the laser light of transverse mode has, in a cross section, a shape (for example, elliptical shape) different from the rectangular shape. For example, when the transverse mode laser light beam of an elliptical shape is incident onto the optical crystal plate 11, generated heat in the optical crystal plate 11 varies along the direction S. Specifically, a temperature becomes highest at the center portion and is gradually lowered toward peripheral portions of the optical crystal plate 11. This brings about the rotatory polarization of the laser light beam and deterioration in the wavelength conversion efficiency.

Figure 3:
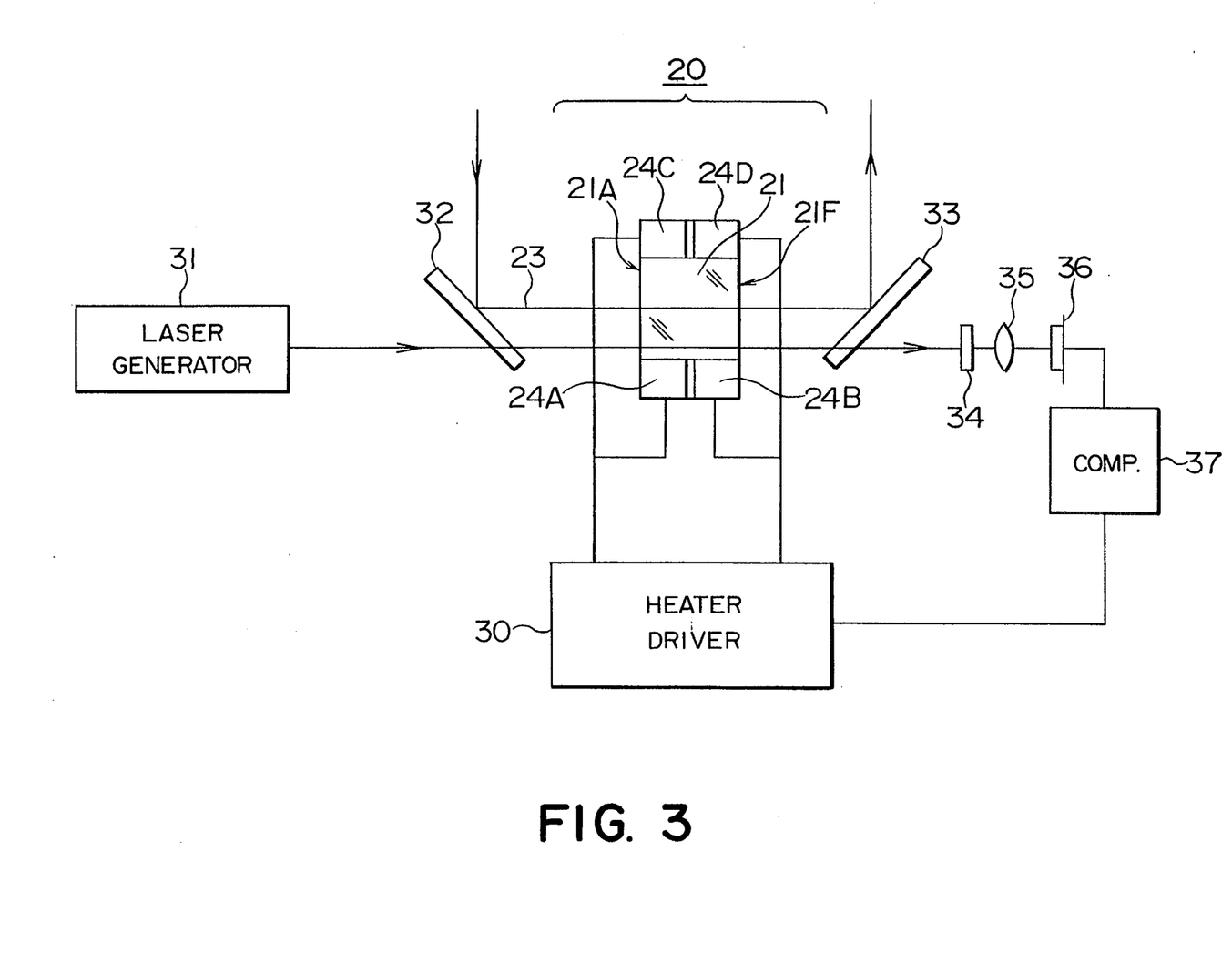
FIG. 3 is a schematic view of a laser light wavelength conversion apparatus according to a first embodiment of this invention.

Referring to FIG. 3, a laser light wavelength converter 20 according to a first embodiment of this invention is operable in response to the incident laser light beam of the first wavelength (for example, 532 nm) to generate, as the output laser light beam, the wavelength converted laser light beam of the second wavelength (for example, 266 nm) which is different from the first wavelength and which is substantially equal to a half of the first wavelength.

Figure 4:
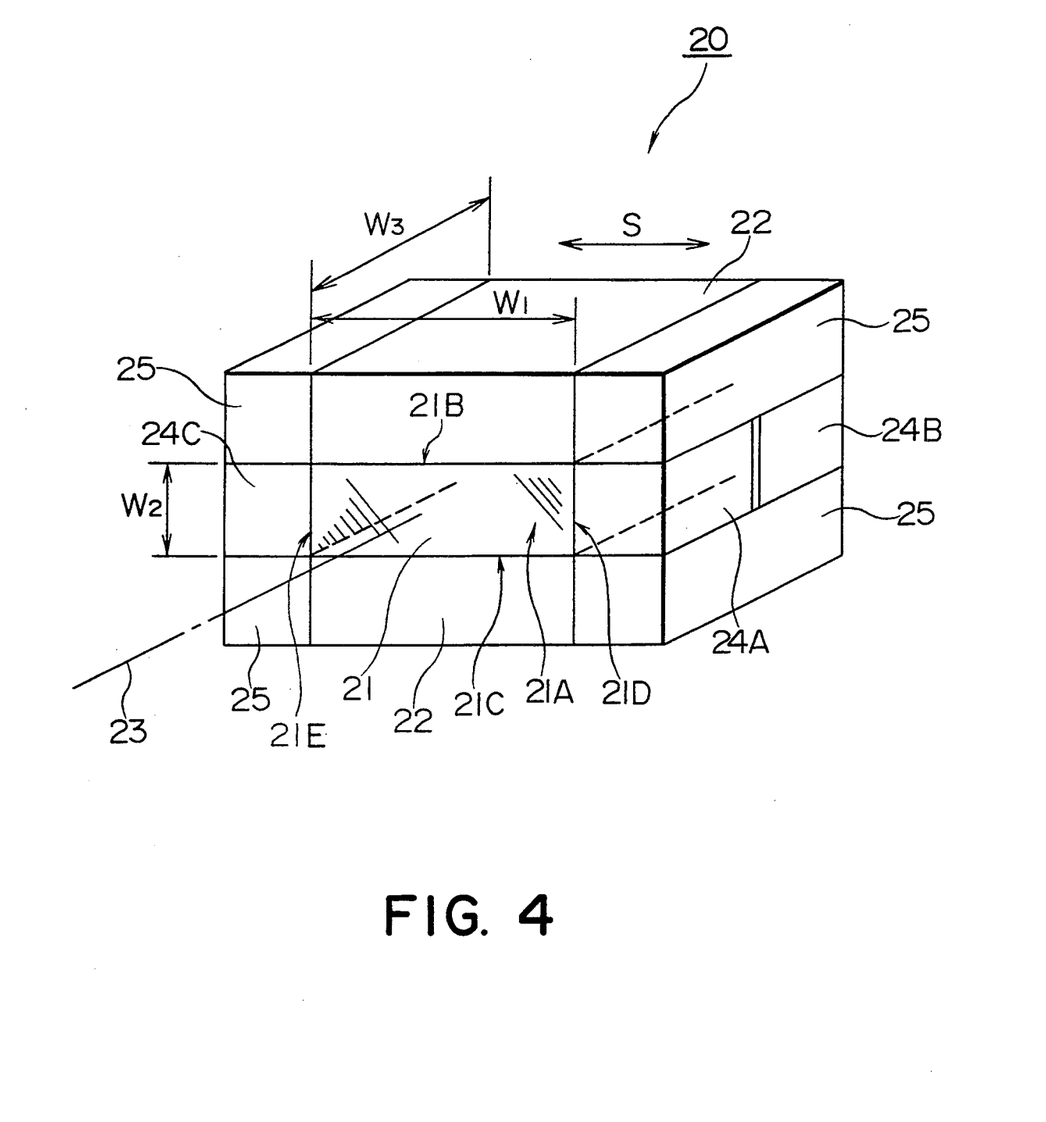
FIG. 4 is a schematic perspective view of the laser light wavelength converter in the first embodiment shown in FIG. 3.

As shown in FIG. 4, the laser light wavelength converter 20 comprises a non-linear optical crystal plate 21 of a thin plate formed by $\beta$-$BaB_2O_4$. The optical crystal plate 21 has an incident surface 21A to which an incident laser light beam is incident along an optimum phase-matched angle direction axis 23.

In FIG. 4, the optical crystal plate 21 is supported by a heat-sink 22 so that the heat-sink 22 is brought into contact with supporting surfaces 21B and 21C extended from the incident surface 21A in perpendicular to the incident surface 21A. Through the heat-sink 22, cooling water of a constant temperature is allowed to pass so as to transfer the heat generated in the optical crystal plate 21 to the heat-sink 22 and to radiate the heat.

Figure 4A:
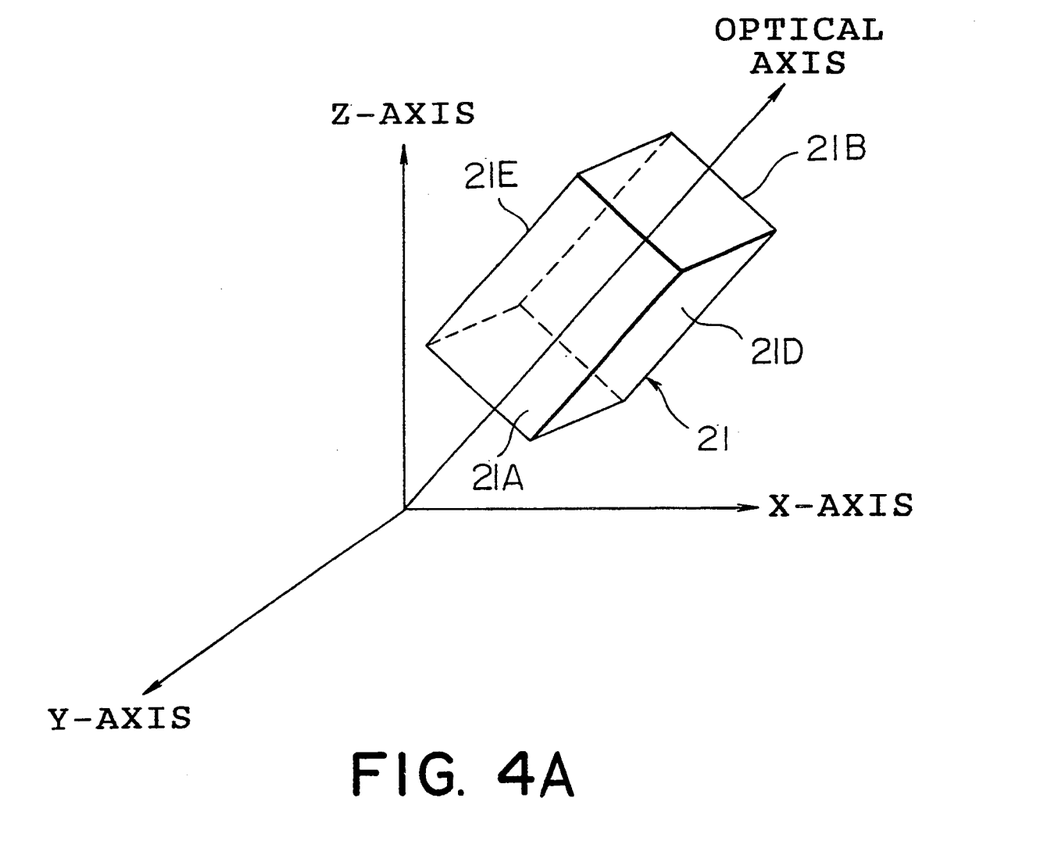
FIG. 4(a) is for use in describing a relationship between each surface of an non-linear optical crystal and an optical axis.

Temporarily referring to FIG. 4(a), the non-linear optical crystal plate 21 has an optical axis in a rectilinear coordinate system defined by an x-axis, a y-axis, and a z-axis when the crystal is used in the laser light wavelength converter 20. More specifically, the optical axis of the non-linear optical plate 21 has predetermined angles with respect to the x-axis, the y-axis, and the z-axis. The predetermined angles are determined in dependency upon a species of each non-linear optical plate 21 and known in the art. Therefore, no description will be made about the angles hereinunder. At any rate, the rectilinear coordinate is defined by an x-y plane determined by the x- and the y-axes, a x-z plane determined by the x- and the z-axes, and a y-z plane determined by the y- and the z-axes.

As illustrated in FIG. 4(a), the non-linear optical crystal plate 21 has the incident surface 21A and an output surface 21F perpendicular to the optical axis, a pair of first side surfaces which are opposite to each other and which are perpendicular to the x-y plane, a pair of second side surfaces which are opposite to each other and which are orthogonal to the first side surfaces. The first side surfaces serve as the supporting surfaces 21B and 21C attached to the heat sink 22 and are therefore depicted at 21B and 21C while the second side surfaces serve to heat the non-linear optical crystal plate 21 and are depicted at 21D and 21E, as will become clear later.

At any rate, it is assumed that the optical axis of the non-linear optical crystal plate 21 is directed to an optimum phase-matched angle direction.

When the incident laser light beam is incident along the optimum phase-matched angle direction light axis 23, the optical crystal plate 21 generates the wavelength converted laser light beam specified by the second harmonic wave. The light axis 23 has an angle relative to the incident surface 21A such that the laser light beam is phase-matched to the second harmonic wave in TYPE I. More particularly, the light axis 23 has an angle phase-matched with the second harmonic wave of Nd:YAG laser light beam which has the wavelength of 532 nm. The incident surface 21A of the optical crystal plate 21 is substantially perpendicular to the light axis 23 and is kept within a range between +5 and −5 degrees. In the illustrated example, each width W1 of the supporting surfaces 21B and 21C is equal to 10 mm while each width W2 of the other surfaces 21D and 21E perpendicular to the supporting surfaces 21B and 21C is equal to 3.5 mm. In addition, an the incident directional width W3 is defined along the light axis 23 and is equal to 7 mm.

On each of the incident surface 21A and the output surface 21F opposite to the incident surface 21A, non-reflection coating layers are deposited and are composed of dielectric material multi-layers so as to prevent the light beam of the wavelengths of 532 nm and 266 nm from being reflected thereon.

Two heaters 24A and 24B are located on the surface 21D while the other two heaters 24C and 24D are placed on the surface 21E. Each heater 24A to D is composed of a Peltier element. In the illustrated example, the heaters 24A and 24B (or 24C and 24D) on the same surface 21D (or 21E) are independently controlled while the heaters 24A and 24C (or 24B and 24D) on the different surfaces 21D and 21E are controlled in common. The heaters 24A to 24D are controlled by a heater driver 30 (FIG. 3) so as to realize a flat or uniform temperature distribution characteristic in the optical crystal plate 21. To this end, each setting temperature of the heaters 24B and 24D is higher than each setting temperature of the heaters 24A and 24B. This is because the temperature of the generated heat gradually decreases along the direction from the incident surface 21 to the output surface 21F.

To the heat-sink 22 for cooling and each of the heaters 24 (suffixes omitted) for heating the optical crystal plate 21, the supporting members 25 are attached to prevent the heat transfer. Further, between the heat-sink 22 and the optical crystal plate 21 and between the heater 24 and the optical crystal plate 21, elastic materials are interposed each of which has the thickness of 0.5 mm and has a high heat transfer characteristic.

Referring back to FIG. 3, the first embodiment further comprises a He-Ne laser generator 31 for generating a reference laser light having the wavelength of 633 nm. The reference laser light is sent through a dichroic mirror 32 to the optical crystal plate 21. The dichroic mirror 32 is set at an the angle of 45° with respect to the incident surface 21A and the output surface 21F and reflects more than 95% of the laser light components having the wavelengths of 532 nm and 266 nm incident with the incident angle of 45°. On the other hand, the dichroic mirror 32 allows to pass through more than 80% of the laser light beam of the wavelength of 633 nm. Another dichroic mirror 33 which may be identical to the dichroic mirror 32 is placed on the output side of the laser light wavelength converter 20.

Herein, it is apparent that the incident laser light of the wavelength of 532 nm is given to the dichroic mirror 32 which sends the reflected laser light beam by the laser light wavelength converter 20 and which is given the wavelength converted laser light beam of the wavelength of 266 nm from the laser light wavlelength converter 32. In this case, the wavelength converted laser light beam of 266 nm is reflected by the dichroic mirror 33 to be produced as an output wavelength converted laser light.

In FIG. 3, the first embodiment further comprises a reference laser light deviation detecting unit composed of a band pass filter 34 for allowing to pass through the reference laser light beam, a lens 35, a PSD semiconductor element 36, and a comparator 37. When the reference laser light beam from the laser generator 31 is passed through the optical crystal plate 21, the laser light path is varied a refractive index of the optical crystal plate 21 fluctuates due to the nonuniform temperature distribution in the optical-crystal plate 21. At any rate, an output signal of the PSD element 36 varies in dependency upon the deviation of the laser light path and is supplied to the comparator 37 to be compared with a reference signal. The comparator 37 produces a difference signal representative of a result of comparison. The difference signal depends on the deviation of the laser light path and varies so that it becomes large with the increase of the variation of the temperature. The difference signal is supplied to the heater driver 30. The heater driver 30 controls the heaters 24A to 24D so as to make the temperature distribution substantially uniform in the optical crystal plate 21. More specifically, with an increase of the variation of the temperature, the heater driver 30 heats the heater 24 to a high temperature. On the other hand, with the decrease of the variation of the temperature, the heater temperature is decreased. The rates of temperature rise between the heaters are preset in consideration of a thermal characteristic of the optical crystal plate 21.

When the optical crystal plate 21 is heated by partially absorbing the energy of the incident laser light beam and the wavelength converted laser light beam, the temperature becomes high at the center portion of the optical crystal plate 21 in the width direction S and becomes low on both of the peripheral sides. Thus, the inclination of the refractive index appears in the width direction S, whereby the reference laser light path is varied. The variation is detected by the PSD element 36 and produced as a detected signal. The detected signal is supplied to the comparator 37 to be compared with the reference signal to obtain the difference signal in the above-mentioned manner. The obtained difference signal is used for controlling the temperature of the heaters 24. In other words, the heater driver 30 controls the temperatures of the heaters 24 to render the temperature distribution uniform. This temperature control operation is continued until the difference between the detected signal from the PSD element 36 and the reference signal becomes zero. When the difference becomes zero, the temperature distribution becomes substantially uniform in the optical crystal plate 21. This shows that the rotatory polarization of the incident laser light beam can be cancelled and that the deterioration of the wavelength conversion efficiency can be prevented.

Pratically, when the incident laser light beam of 532 nm had electric power of about 5 watts, the second harmonic wave of 266 nm could be stably produced and had average power higher than 2 watts.

Figure 5:
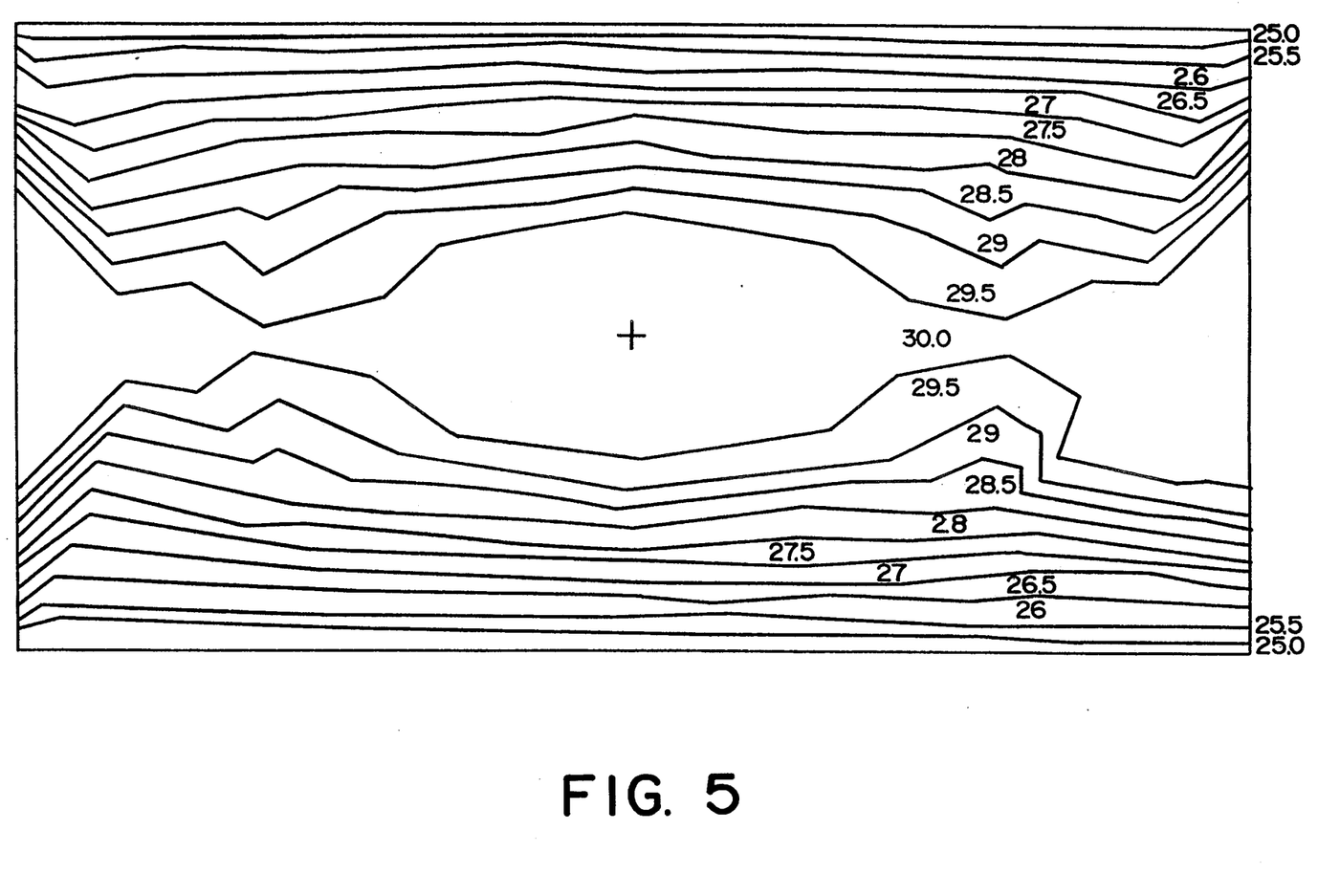
FIG. 5 is a sectional view of the temperature distribution in the optical crystal plate in the first embodiment shown in FIG. 3.
Figure 6:
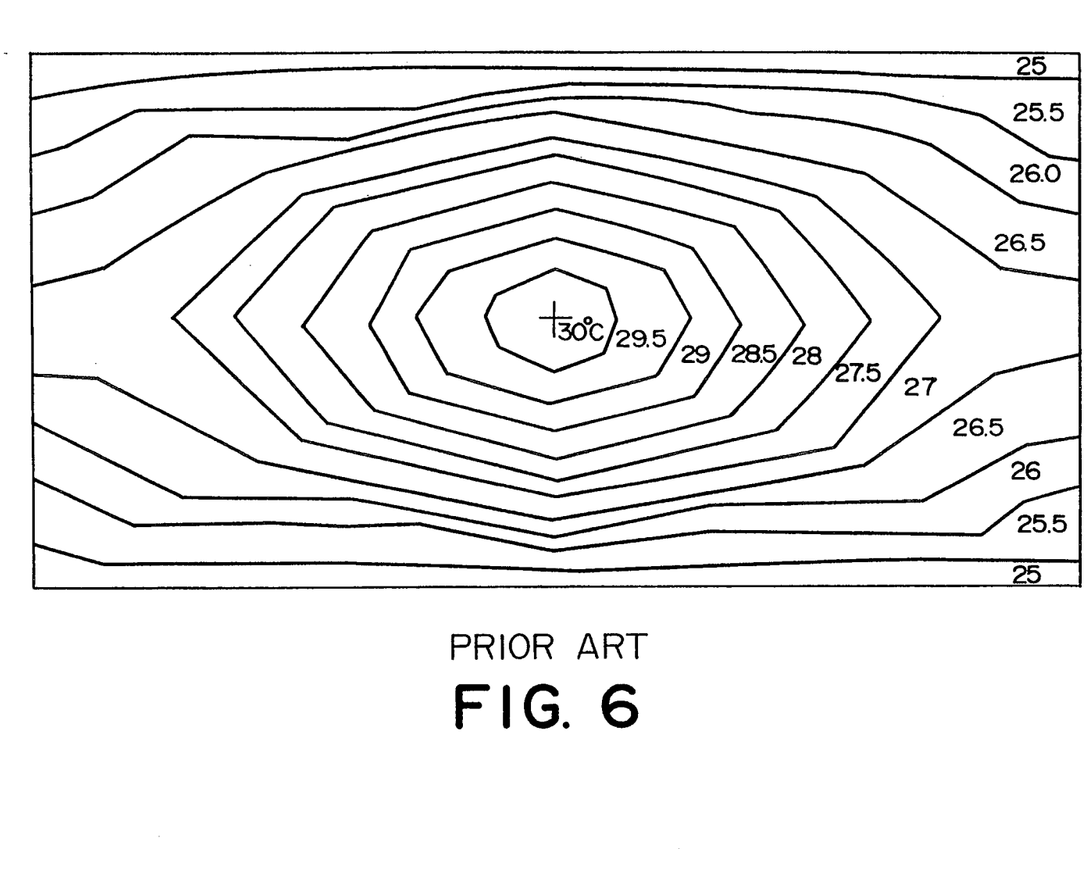
FIG. 6 is a sectional view of the temperature distribution in the optical crystal plate in the convention apparatus shown in FIG. 1.
Figure 7:
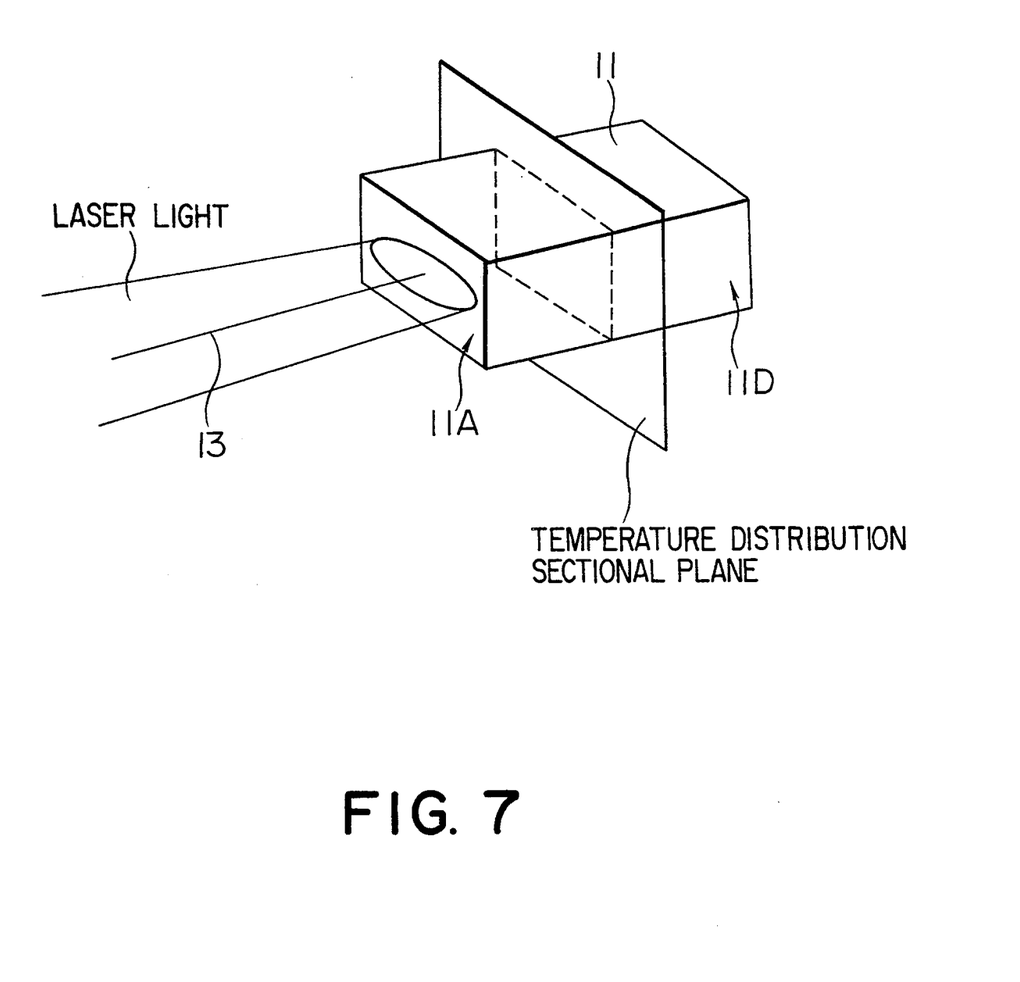
FIG. 7 shows the relationship between the sectional plane of the temperature distribution and the optical crystal plate.

FIGS. 5 and 6 are sectional views for describing the temperature distributions in the optical crystal plates in the first embodiment and the conventional apparatus, respectively. FIG. 7 is for illustrating a relationship between the sectional plane and the optical crystal plate 21. As understood from FIGS. 5 and 6, the temperature distribution shown in FIG. 5 (in the first embodiment) is excellent as compared with that shown in FIG. 6 (in the conventional apparatus) in that the temperature distribution in FIG. 5 is widely spread in the width or lateral direction and is uniform.

Figure 8:
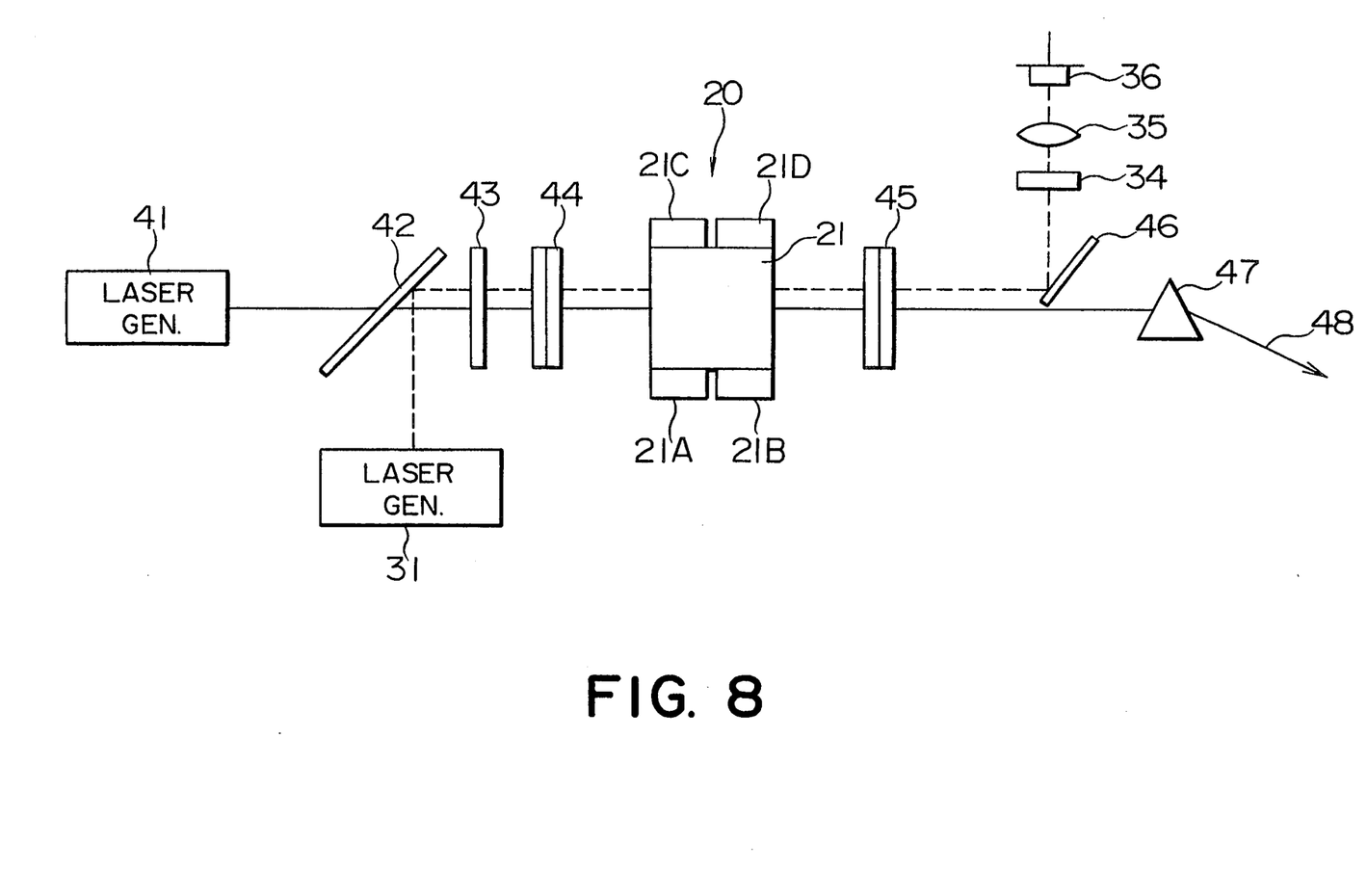
FIG. 8 is a schematic view of a laser light wavelength conversion apparatus according to a second embodiment of this invention.

Referring to FIG. 8, a laser light wavelength conversion apparatus according to a second embodiment of this invention comprises a laser generator 41 for generating the laser light beam of the wavelength of 532 nm which has a wavelength equal to the second harmonic wave of the Nd-YAG laser light beam. The laser light from the laser generator 41 is sent to the dichroic mirror 42. The dichroic mirror 42 allows more than 99% of a P-polarized light beam having the wavelength of 532 nm to pass therethrough and reflects more than 80% of the laser light beam having the wavelength of 633 nm. The polarized laser light beam passed through the dichroic mirror 42 is given to a λ/2 plate 43 having a thickness equal to a half of the laser light of 532 nm and then sent to a cylindrical lens 44. The cylindrical lens 44 has a focal length of 300 mm and an antireflection layer for preventing reflection of the laser light beam of the wavelength of 532 nm. The laser light beam from the plate 43 is converged to the optical crystal plate of the laser light wavelength converter 20 by the cylindrical lens 44. The resultant laser light beam has a transverse mode, a Gaussian distribution and an elliptical shape in section. In addition, the laser light beam of the wavelength of 266 nm, that is, the second harmonic wave is produced from the optical crystal plate 21 and is given to a cylindrical lens 45. The laser light beam of the wavelength of 266 nm and the laser light beam of the wavelength of 532 nm are passed through the cylindrical lens 45 and a plate 46. The laser light beam of 266 nm and the laser light beam of 532 nm are given to a dispersion prism 47 to extract the laser light beam of 266 nm as the output laser light beam 48. The heating mechanism is identical to that in the first embodiment. Both the cylindrical lens 45 and the plate 46 may be identical with the lens 44 and the plate 43, respectively.

Let the laser light beam of 532 nm be given with the average power of 5 watts to the conventional apparatus and the second embodiment. In this event, the conventional apparatus generated the laser light beam having the average power of only 1.7 watts. In contrast, in the second embodiment, it was possible to obtain the laser light beam having the average power of 2 watts.

Figure 9:
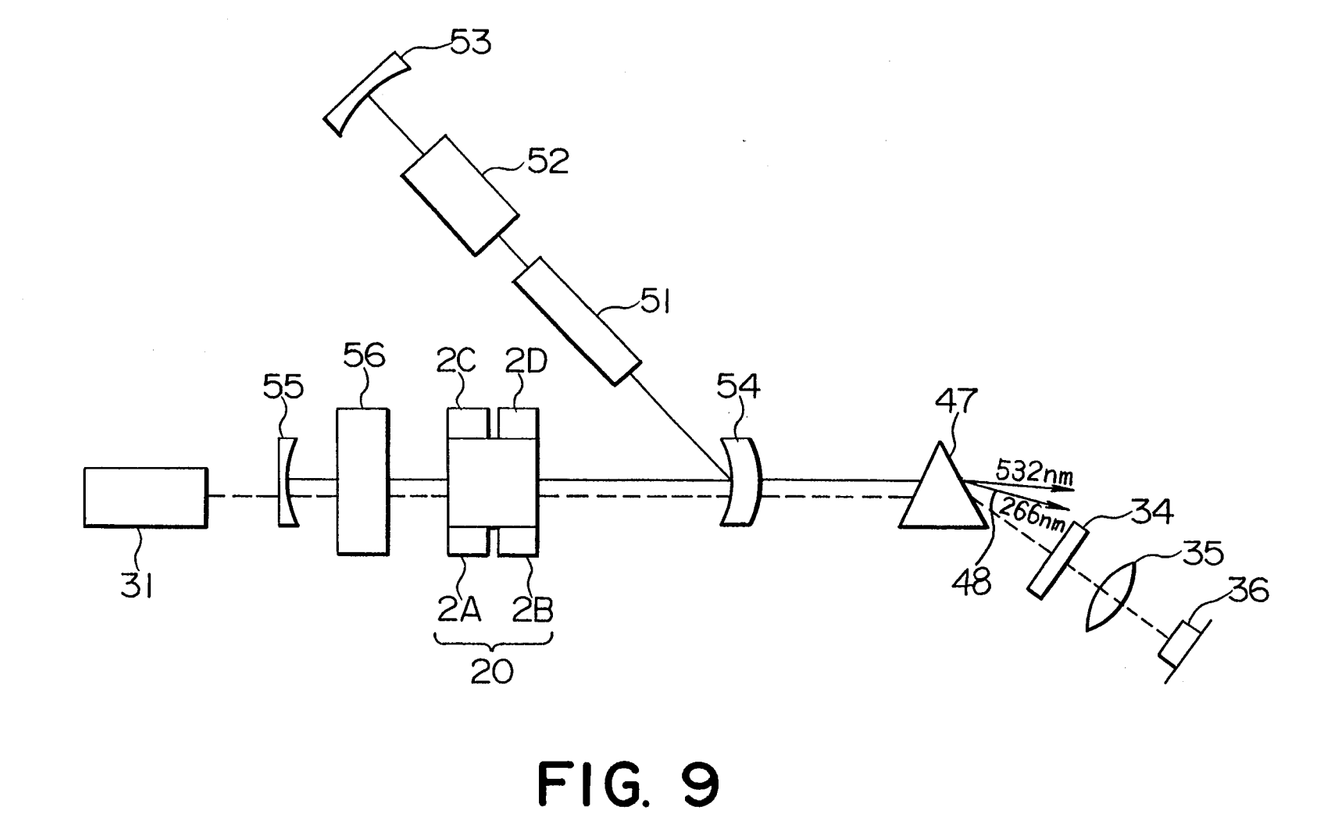
FIG. 9 is a schematic view of a laser light wavelength conversion apparatus according to a third embodiment of this invention.

Referring to FIG. 9, a laser light wavelength conversion apparatus according to a third embodiment of this invention comprises the laser generating unit composed of a laser-medium of a Nd-YAG rod 51, a Q-switch element 52 for generating the laser light, a total reflection mirror 53, a dichroic mirror 54 for totally reflecting a light beam of 1064 nm and for completely passing a light beam of 266 nm, and an additional total reflection mirror 55. Between the dichroic cylindrical mirror 54 and the total reflection mirror 55, the converter 20 and a second harmonic generation unit 56 of a KTP crystal are interposed in the illustrated example. The laser light beam generated by the Q-switch element 52 is given to the crystal 56 to generate the laser light beam of the wavelength of 532 nm through a path from the dichroic cylindrical mirror 54 to the total reflection mirror 55. The laser light beam of 532 nm is reflected by the total reflection mirror 55 and converged to the optical crystal plate 21 of the converter 20 to generate the laser beam of 266 nm, that is, the second harmonic wave. The laser beam of 266 nm has the Gaussian distribution, the transverse mode, and the elliptical shape in section. Both the laser light beams of 532 nm and 266 nm are extracted from the optical resonator through the dichroic cylindrical mirror 54 and then separated by the dispersion prism 47 into the laser light beam 48 of the wavelength of 266 nm and the other laser beams 1064 nm and 532 nm that serve to control a temperature. The heating mechanism is identical to that in the first embodiment.

In the case where the laser light beam of 532 nm with the average power of 10 watts is applied from the optical resonator, the conventional apparatus having no controlled heating mechanism could emit the laser light beam of 266 nm having the average power of only 1.2 watts. In contrast, in the second embodiment illustrated in FIG. 9, it was possible to obtain the laser light beam of 266 nm which had the average power of 2 watts.

In the described embodiments, two heater sets 24A and 24C, and 24B and 24D are included and are controlled at every set in common. It is possible to improve the accuracy of the temperature control and wavelength conversion efficiency by increasing the number of the heaters in each of the heater sets. Further, the heaters in each of the heater sets may be controlled independently of each other. In this case, it is preferable to individually use laser light deviation detecting units corresponding to the respective heaters.

Although the cylindrical lens and the cylindrical mirror are used for obtaining the transverse mode of the laser light beam in the embodiments, it is possible to use any other amorphic optical elements, such as an amorphic prism, an anamorphic prism pair. Further, the non-linear optical cyrstal plate may be of another uniaxial crystal such as KDP, KD*P, and NYAB.

Furthermore, the optical crystal can be pre-heated at the start of the wavelength conversion operation to smoothly obtain the wavelength converted laser light immediately after the start of the wavelength conversion operation. In this case, the temperature of the pre-heating has been set by previous calculation.

Although the invention has been described with reference to specific embodiments, it will readily be possible for those skilled in the art to put this invention into practice in various other manners.

What is claimed is:

1. A laser light wavelength conversion apparatus for use in responding to an incident light beam of a first wavelength to generate an output light beam which has a second wavelength different from said first wavelength, said apparatus comprising:
   a non-linear optical crystal of a thin plate having an incident surface and an output surface opposite said incident surface, said incident surface receiving said incident light beam of said first wavelength and having a center portion and a peripheral portion surrounding said center portion, said optical crystal generating, through said output surface, said output light beam of said second wavelength and having a temperature distribution between said center portion and said peripheral portion on a sectional surface parallel to said incident surface when said incident light beam is incident onto said incident surface; and
   heating means brought into contact with said non-linear optical crystal for forcibly heating said optical crystal without movement of said incident light beam so that said temperature distribution provides a uniform temperature at the center portion of the sectional surface and in a region extending from said center portion to side portions of the crystal.

2. A laser light wavelength conversion apparatus as claimed in claim 1, said crystal having a pair of first side surfaces contiguous to said incident surface in perpendicular to said incident surface and substantially parallel to said incident light beam, wherein said heating means comprises a plurality of heater units brought into contact with said first side surfaces.

3. A laser light wavelength conversion apparatus as claimed in claim 2, said crystal having a pair of second side surface opposite to each other and contiguous to said incident surface and perpendicular to said first side surfaces, further comprising cooling means brought into contact with said second side surfaces for cooling said crystal.

4. A laser light wavelength conversion apparatus as claimed in claim 2, wherein said plurality of heater units have heat capacities and are arranged along said incident laser light beam so that the heat capacities of said heater units are decreased as said heater units are remote from said incident surface.

5. A laser light wavelength conversion apparatus as claimed in claim 1, further comprising:
   detecting means for detecting the temperature of said crystal: and
   means coupled to said detecting means and said heating means for controlling the heating means in accordance with said temperature detected by said detecting means.

6. A laser light wavelength conversion apparatus as claimed in claim 5, wherein said detecting means comprises:
   a reference laser generator for generating a reference laser light beam; means for detecting a variation of a laser path of the reference laser light passed through said optical crystal; and
   means coupled to said variation detecting means for controlling said heating means.

7. A laser light wavelength conversion apparatus as claimed in claim 1, further comprising laser generating means for generating said incident laser light beam.

8. A laser light wavelength conversion apparatus as claimed in claim 7, further comprising;
   optical means for shaping said incident laser light beam in section into a predetermined shape on said incident surface of said optical crystal.

9. A laser light wavelength conversion apparatus as claimed in claim 8, wherein said optical shaping means is a cylindrical lens.

10. A laser wavelength conversion apparatus as claimed in claim 1, wherein said heating means comprises a plurality of heater units for applying thermal energy to said crystal.

11. A laser light wavelength conversion apparatus for use in responding to an incident light beam of a first wavelength to generate an output light beam which has a second wavelength different from said first wavelength, said apparatus comprising:
    a non-linear optical crystal of a thin plate having an incident surface which receives said incident laser light and which has a center portion and a peripheral portion surrounding said center portion, said optical crystal generating said output laser light beam of said second wavelength and having, along at least one direction of said optical crystal, a temperature distribution between said center portion and said peripheral portion when said incident laser light is incident onto said incident surface; and
    heating means for heating said optical crystal to render temperature substantially uniforming along said at least one direction while providing a temperature variation in the crystal in a direction away from said at least one direction.

* * * * *